March 7, 1967          R. E. MORGAN          3,308,397
SATURABLE CURRENT TRANSFORMER-TRANSISTOR INVERTER CIRCUIT
Filed March 19, 1964          4 Sheets-Sheet 1

Inventor:
Raymond E. Morgan,
by Charles W. Helzer
His Attorney.

March 7, 1967 R. E. MORGAN 3,308,397
SATURABLE CURRENT TRANSFORMER-TRANSISTOR INVERTER CIRCUIT
Filed March 19, 1964 4 Sheets-Sheet 2
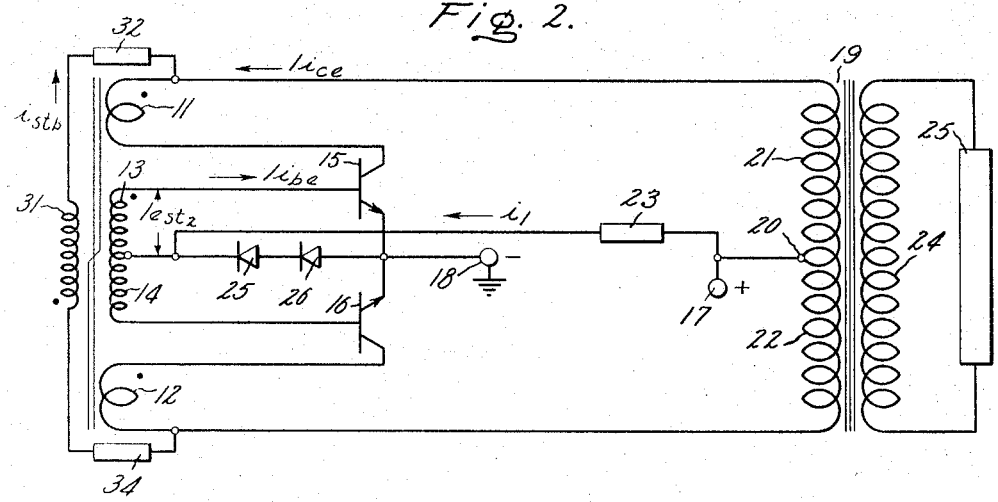
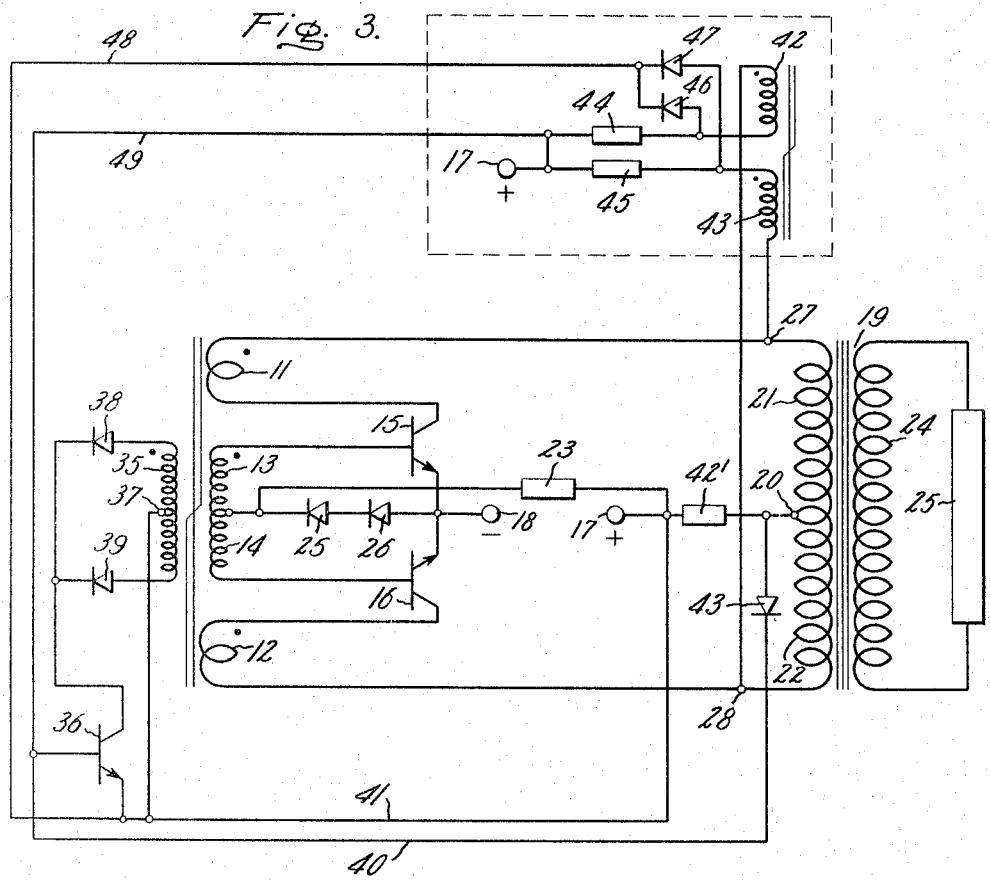
Inventor:
Raymond E. Morgan,
by Charles W. Helzer
His Attorney.

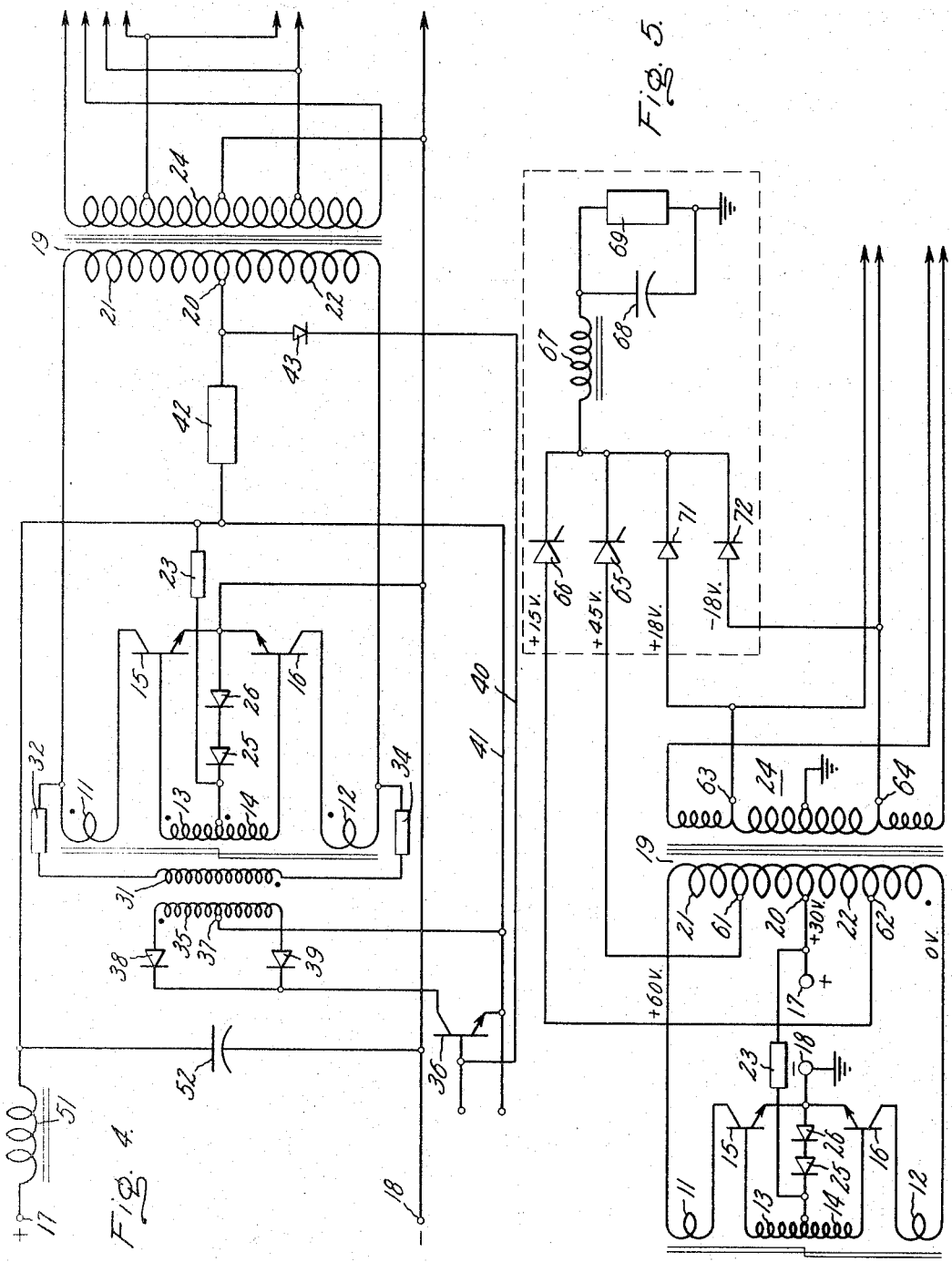

March 7, 1967
R. E. MORGAN
3,308,397
SATURABLE CURRENT TRANSFORMER-TRANSISTOR INVERTER CIRCUIT
Filed March 19, 1964
4 Sheets-Sheet 4

Inventor:
Raymond E. Morgan,
by Charles W. Helzer
His Attorney.

United States Patent Office 3,308,397
Patented Mar. 7, 1967

3,308,397
SATURABLE CURRENT TRANSFORMER-
TRANSISTOR INVERTER CIRCUIT
Raymond E. Morgan, Schenectady, N.Y., assignor to General Electric Company, a corporation of New York
Filed Mar. 19, 1964, Ser. No. 353,195
10 Claims. (Cl. 331—113)

This invention relates to a new and improved power inverter circuit.

More particularly, the invention relates to a new and improved power inverter circuit employing a saturable core current transformer and transistor circuit arrangement capable of obtaining greater efficiency in operation at larger power ratings.

Power inverter circuits are employed to invert direct current electric power to alternating current electric power having any desired frequency and power rating as determined by the rating of the direct current power supply and the size of the components used in designing the circuit. Most inverter circuits accomplish the inversion of direct current electric power to alternating current power by alternately connecting the terminals of the load across alternate terminals of the direct current power supply. In the instant circuit, alternate terminals of an output transformer are connected across a direct current power supply to develop an alternating current potential across the output transformer.

In recent years considerable activity has been directed to the development and refinement of inverter circuits, and particularly inverter circuits employing solid state semiconductor transistor devices. For the most part, inverter circuits known today are designed for use in the milliwatt region, and are employed as sensing and gating circuit arrangements, and in low power signal communication equipments. For this reason, the efficiency of operation of the presently known inverter circuits has not been too critical. Further, the effect of the known inverter circuits on the operation of other elements in a total system in which the inverter is included as a component sub-system, likewise has not been too carefully scrutinized. To be particular, in the inverter circuits heretofore known, if the circuit in its operation developed substantial voltages at different harmonics of the basic operating frequency, such a characteristic was tolerated by including sufficient filtering following the inverter circuit to remove the undesired harmonics. With such an arrangement the overall efficiency of the equipment in which the inverter circuit is included as a part is adversely affected. Further, at the higher power levels, due to the poor efficiency, heating becomes a problem. To overcome these difficulties the present invention was devised.

It is therefore a primary object of the present invention to provide a new and improved inverter circuit capable of operating at large power levels, and having a greater efficiency of operation than many inverter circuits heretofore available.

Another object of the invention is to provide a new and improved power inverter circuit which is capable of absorbing large surges of supply current without introducing into the output alternating current voltage being developed, substantial values of harmonics of the basic operating frequency. As a consequence, the requirements for filtering in successive stages of the equipment in which the inverter is employed as a component part are greatly reduced.

A still further object of the invention is to provide a new and improved power inverter having the above characteristics which is lightweight and compact, and yet relatively simple and inexpensive to manufacture.

In practicing the invention a new and improved inverter circuit is provided which includes in combination a saturable core current transformer means having at least two primary winding portions and respective inductively coupled secondary winding portions. A direct current power supply, an output transformer having a center tapped primary winding, and a pair of conductivity controlled conducting devices such as NPN junction transistor devices, each having input terminals and output terminals, are also provided. The output terminals of each of the conductivity controlled conducting devices are operatively connected in series circuit relationship with the direct current power supply and a respective primary winding portion of the saturable core current transformer means across a respective winding half of the center tap primary winding of the output transformer. The input terminals of each of the conductivity controlled conducting devices are connected to the respective secondary winding portions of the saturable core transforming means that is inductively coupled to the primary winding portion to which the load terminals of the controlled conducting device are connected.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, wherein:

FIGURE 2 is a detailed circuit diagram of a modified form of the new and improved power inverter circuit which provides for no load operation of the circuit;

FIGURE 3 is a detailed circuit diagram of the new and improved power inverter circuit, and illustrates a form of the circuit which provides for overcurrent and second harmonic protection;

FIGURE 4 is a detailed circuit diagram of a complete power inverter circuit showing the same in conjunction with a filtered direct current power supply, and providing for no load operation as well as overcurrent protection;

FIGURE 5 is a detailed circuit diagram of a version of the new and improved power inverter circuit which employs an autotransformer in its output whereby, commutation of an auxiliary silicon controlled rectifier power circuit connected thereto can be readily and economically accomplished;

Figure 6:
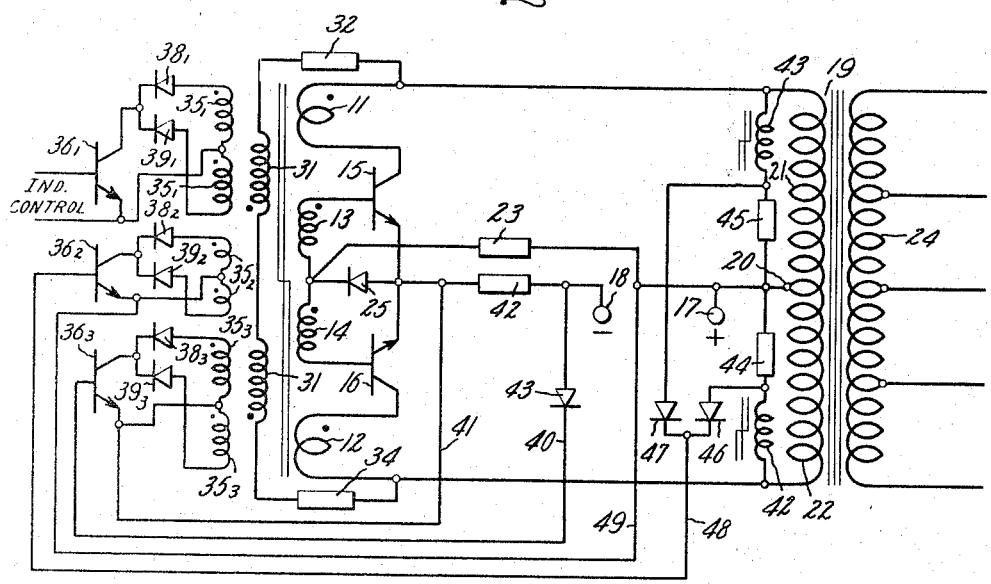
Figure 7:
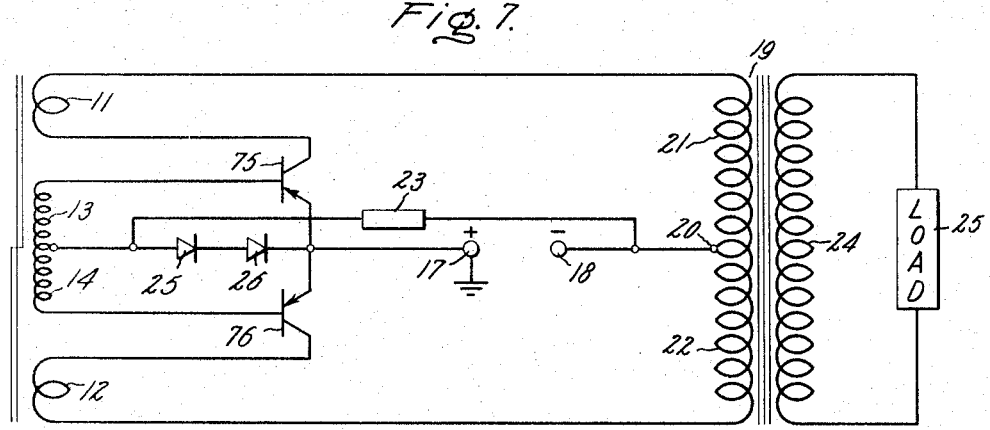
Figure 8:
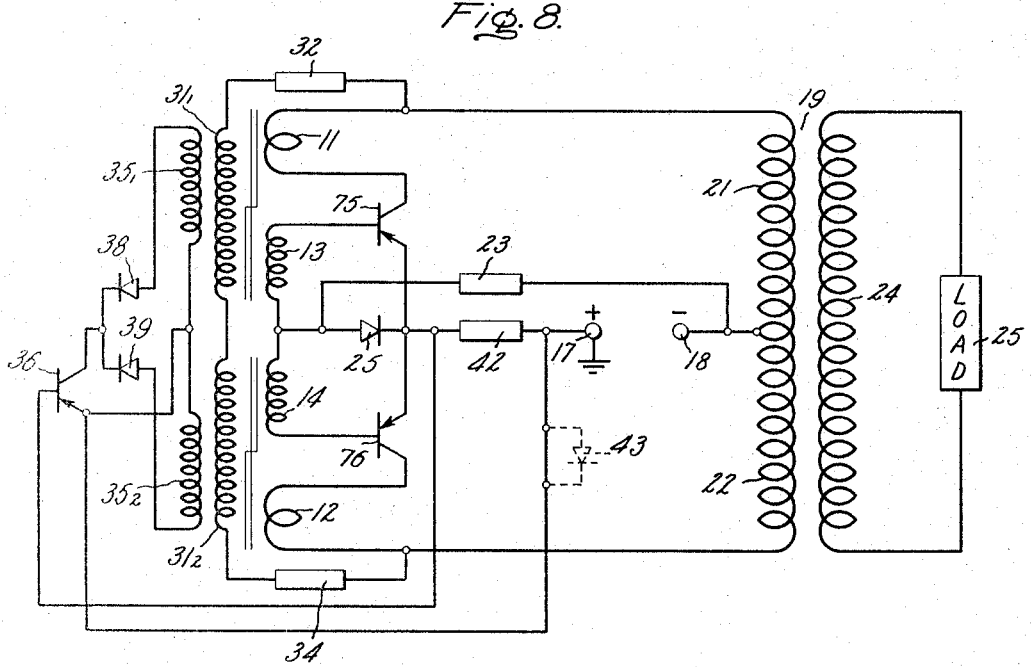

FIGURE 6 is a detailed circuit diagram of the power inverter circuit which provides not only overcurrent protection, no load operation and protection against the development of second harmonics in the alternating current output signal developed by the circuit, but also provides an additional control phenomena which may be sensed at some other part of the equipment in which the inverter circuit is employed, and used to control the operation of the inverter;

FIGURE 7 is a detailed circuit diagram of a different form of the basic power inverter circuit configuration employing a different type of solid state semiconductor transistor device; and FIGURE 8 is a detailed circuit diagram of a form of the new and improved power inverter circuit illustrated in FIGURE 7 showing the same being used in conjunction with overcurrent sensing means as well as a no load current bias winding means, and further illustrates a form of the invention employing two separate saturable core current transformers as a part thereof.

Figure 1:
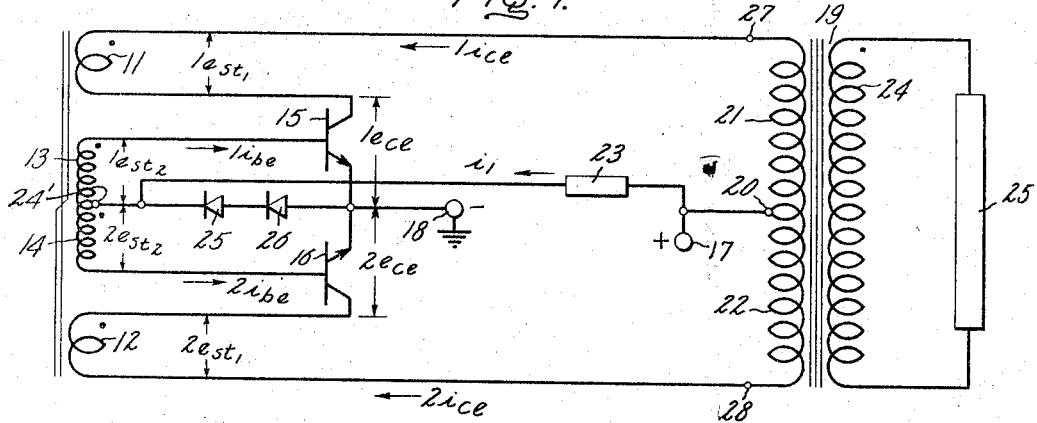
FIGURE 1 is a detailed circuit diagram of the basic circuit configuration of a new and improved power inverter constructed in accordance with the principles of the present invention.

FIGURE 1 of the drawings shows a simplified version of a new and improved saturable current transformer-transistor inverter power circuit constructed in accordance with the invention. The inverter circuit shown in FIGURE 1 is comprised by a saturable core current transformer having at least two primary winding portions 11 and 12 which are inductively coupled to associated secondary winding portions 13 and 14, respectively. The saturable core current transformer 11 through 14 is a conventional wire wound saturable current transformer of the type described for example in chapter 21 of the textbook entitled, "Magnetic Amplifiers," by H. F. Storm published by John Wiley and Sons, Inc., New York, N.Y. —copyrighted in 1955, and recorded on Library of Congress Catalog Card No. 55–6432. The primary windings 11 and 12 of the saturable core current transformer are connected through the respective emitter-collector circuits of a pair of conductivity controlled NPN junction silicon transistors 15 and 16 respectively to the terminals of a direct current power supply (not shown) connected between the positive terminal 17 and the grounded negative terminal 18. The positive terminal 17 of the direct current power supply is connected to a center tap point 20 of an output transformer 19 having a center tapped primary winding comprised by two windings halves 21 and 22. The primary windings halves 21 and 22 are inductively coupled through a linear core to a secondary winding 24 having a load 25 connected across it. By reason of the above arrangement, the primary winding portion 11 of the saturable core current transformer, the collector-emitter circuit of the NPN junction transistor 15 which comprises its output circuit, and the direct current power supply are connected in series circuit relationship across the winding half 21 of the center tapped primary winding of output transformer 19. Similarly, the primary winding portion 12 of the saturable core current transformer, the output circuit comprised by the collector-emitter circuit of junction transistor 16 and the direct current power supply are connected in series circuit relationship across the primary winding half 22 of the center tapped primary winding of the output transformer 19. The NPN junction transistor devices 15 and 16 may comprise any junction transistor device; however, for the larger power rated circuits such as 300 watts or more it is preferred that a silicon junction transistor such as the Westinghouse type 2N1825, be employed, since since this particular type transistor is designed to tolerate large surge currents. The direct current power supply connected across the terminal points 17 and 18 may comprise any conventional direct current power supply such as a battery, or the output of a rectifier power pack. The output transformer 19 preferably is a bifilar wound center tapped transformer having an equal number of turns on each side of the center tap so as to provide balance with the two sides, and (for example) may use deltamax core No. 5320D1 (manufactured and sold by the Arnold Engineering Company) or its equivalent wound with a No. 12 wire covered with heavy formex insulation.

In addition to the above basic components of the circuit, it is preferred that an operational power inverter constructed in accordance with the present invention employ starting circuit means comprised by a current limiting resistor 23 connected between the positive terminal 17 of the direct current power supply and the center tap point 24′ between the secondary winding portions 13 and 14 of the saturable core current transformer. By reason of this connection, starting current will be caused to flow through the limiting resistor 23 through the base to emitter circuits of either of the junction transistors 15, 16 and through the direct current power supply connected across the terminals 17 and 18.

In order to assure that starting current does indeed flow through the base-emitter circuits of respective ones of the junction transistor devices 15 and 16, additional impedance means comprised by a pair of blockings diodes 25 and 26 are connected in common to the base-emitter circuits of each of the junction transistor devices 15 and 16.

The polarities of the blocking diodes 25 and 26 are arranged in a manner such that these diodes block current flow from the power supply connected across the terminals 17 and 18 through the limiting resistor 23 directly, but instead force the current to flow through the base-emitter circuits of respective ones of the junction transistor devices 15 and 16.

The new and improved power inverter circuit shown in FIGURE 1 operates in the following manner. The starting current $i_1$ flows through the limiting resistor 23, through the winding portion 13 into the base of the NPN junction transistor 15. This causes a base-emitter current $1i_{be}$ to flow through the transistor 15 to ground and results in turning on the transistor 15 so that an emitter-collector current $1i_{ce}$ flows in the emitter-collector circuit. The emitter-collector current $1i_{ce}$ flowing through the primary turns of the primary winding portion 11 is transformed into the secondary winding portion 13 so as to produce a voltage $1e_{st2}$ across the secondary winding portion 13 which is positive at the dot. This voltage results in driving the base of the transistor 15 even more positive so that the transistor 15 is turned full on due to the regenerative effect of winding portion 11 almost instantaneously. The transistor 15 then is held full on by the positive voltage $1e_{st2}$ for a fixed period of time until the saturable core transformer comprised by the winding portions 11 through 14 saturates.

When the saturable core current transformer saturates, the primary and secondary winding portions 11 and 13 are decoupled so that the voltage $1e_{st2}$ becomes less positive than previously, and the transistor 15 starts to turn off. As the transistor 15 starts to turn off the collector-emitter current $1i_{ce}$ starts to decrease, and this decreasing collector-emitter current unsaturates the winding portions 11 and 13, and reverses the polarity of the potential $1e_{st2}$ so that it now becomes negative at the dot end of the winding portion 13. This results in turning the transistor 15 fully off, and as transistor 15 turns off, the starting current $i_1$ flowing through starting resistor 23 turns on the transistor 16. The transistor 16 will then operate through a half cycle of operation in the same manner as described with relation to the transistor 15 until the saturable core current transformer 11 through 14 again saturates, resulting in turning off transistor 16, and again turning on transistor 15 to thereby initiate a new cycle of operation of the inverter.

From a consideration of the above description, it can be appreciated that upon the transistor 15 being turned full on, the effect will be to couple the point 20 on the center tapped primary winding of output transformer 19 to the positive terminal of the direct current power supply. Ignoring the forward drop of transistor 15 as well as the drop in the winding portion 11 which is negligible for most purposes, the point 27 will be effectively coupled to power supply terminal 18. As a consequence, a potential will be developed in the secondary winding 24 which is negative at the dot end of the secondary winding. During the next half cycle of operation when the transistor 15 is turned off and transistor 16 is turned on, the effect will be to couple the terminal 18 of the direct current power supply to point 28 of the center tapped primary winding of output transformer 19. The center tap point 20 stays coupled to the positive terminal 17 of the direct current power supply. As a consequence, an output potential will be developed in the secondary winding 24 which is positive at the dot end of winding 24. Successive operations of the transistors 15 and 16 therefore will develop an alternating current potential across the secondary winding 24 of output transformer 19.

The voltage level and current (hence power rating) of the alternating current developed by the inverter will of course depend upon the value of the direct current power supply connected across terminals 17 and 18 as well as the ratings of the transistor and other parameters of the inverter circuit. The frequency of the output alternating current potential is determined by the length of time that the transistors 15 and 16 remain on, and this is set by the volt-seconds rating of their associated winding portions 11, 13 and 12, 14 of the saturable core current transformer. The volt-second rating of the winding portions 11, 13 and 12, 14 respectively of the saturable core current transformer is in turn determined by the flux density excursion of the core from negative to positive saturation levels, the number of turns on the secondary winding portions 13 and 14, respectively, and the area of the magnetic core employed in the transformer. By design and proper construction techniques, the volt-second rating of the secondary winding portions 13 and 14 can be held constant (within about 3% per 100° centigrade change in ambient temperature). With the volt-seconds of the secondary windings 13 and 14 thus held constant, the frequency then becomes inversely a function of the secondary voltages $1e_{st2}$ and $2e_{st2}$.

The voltages $1e_{st2}$ and $2e_{st2}$ in fact are the voltage drops of the base-emitters of the junction transistors 15 and 16, respectively, together with the voltage drops across the diodes 25 and 26 which are connected in common to the base-emitter circuits of both of these transistors. If the circuit of FIGURE 1 is considered without the diodes 25 and 26 present, it can be appreciated that the voltages $1e_{st2}$ and $2e_{st2}$ then become entirely dependent upon the voltage drops across the base-emitters of each of the transistors 15 and 16, respectively. It can be appreciated that in practice, the base-emitter impedance of transistors varies quite widely so that without the diodes 25 and 26 the values of the voltages $1e_{st2}$ and $2e_{st2}$ would differ widely. As a consequence, the two transistors would be on for unequal periods of time thereby introducing undesired harmonics into the output alternating current potential being developed across the output transformer 19. As a consequence of such operation, the output transformer 19 could be driven into saturation resulting in misoperation of the inverter circuit. To avoid any such undesired result, the diodes 25 and 26 are introduced at the point in the circuit shown and constitute additional impedances added to the base-emitter circuit at a point which is common to the base-emitter circuits of both transistors 15 and 16. Because of the insertion of this additional impedance, the base-emitter voltage drops across the respective transistors 15 and 16 then become only a small part of the total base-emitter impedance seen by the secondary winding halves 13 and 14, respectively, and hence the voltages $1e_{st2}$ and $2e_{st2}$ become much less dependent upon the base-emitter characteristics of the individual transistors 15 and 16.

FIGURE 2 of the drawings shows a version of the new and improved power inverter circuit for use in those circuit applications where it will be necessary for the inverter to operate under no load conditions. In describing the operation of the circuit shown in FIGURE 1 of the drawings, it was assumed that there was a minimum load current sufficient to hold the collector current $1i_{ce}$ of transistor 15 (for example) to a value greater than 1 ampere. This minimum value of collector current $1i_{ce}$ is necessary since if the collector current $1i_{ce}$ is less than 1 ampere the primary ampere turns of the saturable core current transformer primary winding 11 is not sufficient to supply the core losses of the saturable core current transformer, and the voltage $1e_{st2}$ would be less than 2 volts which is not sufficient to hold the transistor 15 turned on. The same statement can be made regarding the portion of the circuit including junction transistor 16. As a result, for no load operating conditions, the circuit arrangement of FIGURE 1 might tend to break into a high frequency oscillation. Such a result might not occur if the power rating of the circuit is sufficiently low, however for larger rated power circuits, no load operation of the inverter circuit of FIGURE 1 can end in the above result.

For the above reasons, the circuit arrangement of FIGURE 2 is provided, and includes no load current bias winding means. The no load current bias winding means is comprised by a no load current bias winding 31 which is connected through a pair of limiting resistors 32 and 34 to the output emitter-collector circuits of the NPN junction transistors 15 and 16. By this arrangement, upon the junction transistor 15 being turned on in the above described manner by the starting circuit $i_1$ flowing through resistor 23, bias current $i_{stb}$ will be supplied to the bias winding 31 through the closed circuit loop including resistor 32, primary winding portion 11, conducting transistor 15, and the direct current power supply connected to terminals 17 and 18, the winding half 22 of output transformer 19, and limiting resistor 34. Upon junction transistor 15 being turned off and transistor 16 being turned on the direction of current flow of bias current $i_{stb}$ through the bias winding 31 will be reversed. By proper design of the bias winding 31, and adjustment of the values of the resistors 32 and 34, a bias current $i_{stb}$ of approximately 30 milliamperes can provide to the base of the junction transistor 15 a base current $1i_{be}$ having a value such that the transistor 15 will be held full on. By this arrangement, for example, a 30 milliampere bias current $i_{stb}$ flowing in the bias winding 31 has the same effect as a 1 ampere collector-emitter current $1i_{ce}$ flowing in a 3 ampere turn primary winding portion 11 of the saturable core current transformer. It of course follows that upon junction transistor 15 being turned off and junction transistor 16 being turned on the direction of the bias current $i_{stb}$ will be reversed, but its effect on the junction transistor 16 will be the same. It should be noted that if there is a minimum load on the new and improved power inverter circuit, then no bias winding such as 31 is required. However, when a minimum load is not needed the bias circuit requires much less power than providing an artificial minimum load since the power required by the bias circuit is less than 5/10 of 1% of the maximum load. Additionally, it might be noted that in some circuit applications the number of turns on the primary winding portions 11 and 12 can be increased to obviate the need for the bias winding, or to reduce the value of the bias current $i_{stb}$ required. With particular regard to circuits having lower power ratings such a technique might be preferred over the provision of a bias winding in order to operate such circuits under no load operating conditions.

FIGURE 3 of the drawings illustrates an embodiment of the new and improved inverter circuit which provides for overcurrent protection and protection against undesired harmonics in the frequency of the alternating current output potential developed across the output transformer 19. For this purpose, inhibit winding means are provided which include an inhibit winding 35 that is inductively coupled to the secondary winding portions 13 and 14 of the saturable core current transformer. The inhibit winding means 35 is controlled by a control means comprised by an NPN junction transistor 36. Transistor 36 has its emitter electrode connected to the center tap point 37 of the inhibit winding 35 and its collector electrode connected to a pair of blocking diodes 38 and 39 which in turn are connected to the respective end terminals of inhibit winding 35. The emitter electrode of NPN junction transistor 36 is also connected through a conductor 41 to one terminal of an overcurrent sensing resistor 42'. This same terminal of the overcurrent sensing resistor 42' also is connected directly to the terminal 17 of the direct current power supply, and the remaining terminal of resistor 42' is connected to the mid tap point 20 and through a blocking diode 43 and conductor 40 to the base of the NPN junction transistor 36.

By reason of the above arrangement, the overcurrent sensing resistor 42' effectively is connected in series circuit relationship with the direct current power supply intermediate the mid tap point 20 on the primary winding of output transformer 19 and the positive terminal 17 of the direct current power supply. By this arrangement, should an overcurrent flow occur through either winding half of the primary winding of output transformer 19, due for example to the development of a short circuit, a potential will be developed across the overcurrent sensing resistor 42' which potential will be positive at the point 20 with respect to the point 17. As a consequence, the control transistor 36 will be turned on so as to circulate current flow through either one of the winding halves of the inhibit winding 35, and respective ones of the diodes 38 and 39 determined by which one of the power transistors 15 or 16 is conducting. As a consequence of the control transistor 36 being turned on, therefor, the inhibit winding 35 will circulate current so as to load the secondary winding portions 13, 14 respectively of the saturable core current transformer thereby preventing these winding portions from developing sufficient base current to maintain their associated power transistors 15 or 16 turned on. The saturable current transformer 11 through 14 being a current transformer in contrast to a voltage transformer, permits this inhibit function.

For best operation, the ampere turns of the inhibit winding plus the ampere turns of the secondary winding portions 13 or 14 must be less than the ampere turns of the primary winding portions 11 or 12. For example, if it is assumed that the turns ratio of the secondary winding portion 13 relative to the primary winding portion 11 of the saturable core current transformer is six, and the turns ratio of the inhibit winding 35 to the primary winding portion 11 of the saturable core current transformer is fifty, then to maintain the transistor 15 turned on the collector-emitter current $1i_{ce}$ must be greater than six times $1i_{be}$ plus fifty times $i_{Ih1}$ where $i_{Ih1}$ is the current flowing in inhibit winding 35. If $i_{Ih1}$ is equal to .02 $1i_{ce}$, then $1i_{be}$ will become zero and transistor 15 will be turned off. After transistor 15 turns off then $1i_{ce}$ drops to a value of $i_1$ times half the current gain of the transistor 15. Should the inhibit winding 35 be turned on while the power transistor 16 is conducting, the transistor 16 will be turned off in a manner similar to that described with relation to power transistor 15. By means of this arrangement, the operation of the new and improved power inverter can be stopped by a very low power signal (about 20 milliwatts) developed across the overcurrent sensor and applied to the control transistor 36. The operation of the inverter may be inhibited within about 20 microseconds even if the collector-emitter current $1i_{ce}$ is equal to or greater than 30 amperes. The inhibit operation may be used in conjunction with various protection circuits, current limit circuits, etc. which can be connected to control the inhibit circuit. Also, as will be shown in connection with FIGURE 6, additional inhibit windings may be added, and various inhibit circuits may be insulated from each other, to provide any desired number of controls over the operation of the new and improved power inverter.

It is not necessary that the various inhibit circuits be insulated from each other however, as illustrated in FIGURE 3. The circuit arrangement shown in FIGURE 3 further includes second harmonic detecting circuit means connected to operate the inhibit winding means in common with the overcurrent sensor. The second harmonic detecting circuit means is comprised by a pair of saturable reactors 42 and 43. One load terminal of the saturable winding 43 is connected to the terminal point 27 of the primary winding of the output transformer 19, and one load terminal of the saturable winding 42 is connected to the terminal point 28 on the primary winding output transformer 19. The remaining load terminals of the saturable windings 42 and 43 are connected through limiting resistors 44 and 45, respectively, to the positive terminal 17 of the direct current power supply. These last mentioned load terminals of the saturable reactors 42 and 43 are also connected through blocking diodes 46 and 47, respectively, and through a conductor 48 back to the emitter of the control transistor 36. The circuit is completed by connecting the positive terminal 17 of the direct current power supply through a conductor 49 (shown for convenience) to the base of the control transistor 36. By this arrangement, the saturable windings 42 and 43 normally will remain in their unsaturated condition, that is operate on the linear portion of their hysteresis curve, during normal operation of the power inverter circuit of FIGURE 3. However, should any unbalance occur in the operation of the two power transistors 15 or 16 so that a second harmonic is developed in the frequency of the output alternating current potential developed across the output transformer 19, one of the other of the saturable reactors 42 or 43 will be driven into saturation prior to the primary winding half of output transformer 19 across which the respective saturable windings 42 and 43 are effectively connected. Hence, should one of the windings 42 or 43 saturate, the immediate effect is to couple one or the other of the resistors 44 or 45 through the conducting power transistor 15 or 16 (whichever is conducting) to the grounded terminal 18 thereby applying a turn on potential to the control transistor 36. This results in turning on inhibit current flow $i_{Ih1}$ through the inhibit winding 35 thereby inhibiting further operation of the power inverter in the previously described manner.

The operation of the circuit employing saturable windings 42 and 43 is very unique, and is inherent in the arrangement of the associated circuit components, including the diodes 46 and 47. If it is assumed that the circuit is in the half cycle of operation involving conduction of transistor 16, and conduction of load current through the lower primary winding section 22 of transformer 19, then the lower terminal of primary winding section is negative with respect to the center tap 20. If an overvoltage condition occurs on lower primary winding section 22, and if that overvoltage is sufficient to saturate reactor 42, then the switching action of the saturated reactor 42 simply connects the negative voltage at the lower terminal of winding section 22 to the anode of diode 46, and the diode 46 blocks this negative voltage. However, the upper section 21 of the primary winding of transformer 19 has an opposite polarity voltage induced therein which is substantially equal and opposite to the voltage appearing across winding section 22. This voltage is applied across saturable reactor 43 and resistor 45, and if it is too high, the reactor 43 saturates and provides a positive signal through the blocking diode 47 and connection 48 to turn on the inhibiting transistor $36_2$ and thus inhibit conduction. Thus, with the circuit arrangement as shown, the saturable reactor 43 acts as a load on the primary winding 21 during the half cycle of nonconduction of transistor 15 and conduction of transistor 16. The reactor 43 thus serves as an overvoltage detector for the primary winding section 22. There is an important advantage in this arrangement. The voltage induced in winding section 21 is determined entirely by the magnitude of the magnetic flux in the transformer 19 induced by the current in section 22. Thus, a resistance drop voltage component appears across winding section 22 which does not appear as an induced component of the voltage across winding section 21. Since the voltage across winding section 21 thus is an indication only of the flux in the transformer, it is a very accurate indication of the risk of saturation of the transformer 19. Thus, the winding 43 accurately measures the "saturation" voltage of the transformer.

It is understood, of course, that on the opposite cycle of conduction, the saturable winding 42 acts as a detector for an overvoltage condition on primary winding section 21 through the voltage induced thereby in primary winding section 22.

FIGURE 4 of the drawings illustrates a complete new and improved power inverter constructed in accordance with the invention which employs the combined features of a no load current bias winding means 31 and an inhibit winding means 35. The inhibit winding means 35 is controlled by control means provided by the control transistor 36 controlled from an overcurrent sensing resistor 42 described more fully with relation to FIGURE 3 of the drawings, and in addition may be controlled from some other source of control signals (not shown) connected to the base-emitter circuit of the control transistor 36. For example, the base of the control transistor 36 could be connected to a second harmonic detecting circuit in the manner shown with relation to FIGURE 3 of the drawings. Alternatively, the base of control transistor 36 may be connected to some other source of control signals such as a sensing circuit connected at some other point in the equipment of which the power inverter circuit of FIGURE 4 comprises a part.

In addition to the above features, in the circuit arrangement of FIGURE 4, the direct current power supply terminals 17 and 18 are connected to the new and improved power inverter through a filter circuit arrangement comprised by a filter inductance 51 and a filter capacitor 52. The filter inductance 51 is connected in series circuit relationship with the direct current power supply, and the filter capacitor 52 is connected directly across the direct current power supply terminals 17 and 18. A filter arrangement such as this may be required in certain applications where it is necessary to reduce the ripple in the output alternating current developed across output transformer 19. With such a filter arrangement, the power inverter circuit will be required to handle large surge currents at the time that the filter capacitor 52 or its equivalent connected to some other point in the circuit, is charged up. During surge operation of the circuit, the secondary winding portions 13 or 14 of the saturable core current transformer will increase the base-emitter current of either one of the power transistors 15 or 16, depending upon which one is conducting, as the collector current increases. This operation tends to hold the power transistors full on during the surge of charging current to the filter capacitor. With the power transistors 15 or 16 held full on so that their collector-emitter voltage will be less than 1 volt, the power transistors can easily tolerate the large surge currents. In addition to the above condition, there are other surge current conditions that can occur in the operation of the power inverter in a similar manner. One of these surge conditions can occur while starting the saturable core current transformer-transistor power inverter. This may occur during starting if the output transformer 19 happens to saturate during the starting period. If the output transformer 19 saturates during the starting period, it appears to the inverter as if the load circuit were short circuited. As a consequence, the input filter inductance 51 of the circuit arrangement shown in FIGURE 4 will limit the rate that the collector current increases so that it is limited to about 200% of the collector current at maximum load. This form of surge current likewise can be tolerated since the secondary winding portions 13 and 14 of the saturable core current transformer again will maintain the power transistors 15 or 16 turned full on so that these transistors can tolerate the large surge currents which are maintained for only short periods of time. With the arrangement shown in FIGURE 4, an integrating delay can be used in the current limiting sensing arrangement comprised by resistor 42. Such a delay can be easily introduced into the conductor 40 for example thereby permitting surges beyond the current limit for predetermined periods of time.

FIGURE 5 of the drawings illustrates an interesting application of a new and improved power inverter circuit for use in driving a load through a simple silicon controlled rectifier array. In the circuit of FIGURE 5, the output transformer 19 has a center tap secondary winding 24 with both the center tapped primary winding and secondary windings having intermediate tap points 61 and 62, 63 and 64, respectively, connected to their respective winding halves. A pair of silicon controlled rectifiers 65 and 66 have their anode electrodes connected to the intermediate tap points 61 and 62, respectively, on the primary winding halves of output transformer 19. The cathode electrodes of SCR's 65 and 66 are connected in common through a filter circuit comprised by a filter inductance 67 and filter capacitor 68 to a load 69. A suitable source of gating signals (not shown) is connected to the gating electrodes of each of the silicon controlled rectifier devices 65 and 66 for gating on these devices at desired intervals when the anodes of the devices are driven positive by the applied alternating current potential being developed across the respective winding halves of the primary winding of output transformer 19. A pair of diode devices 71 and 72 have their anode electrodes connected to respective ones of the intermediate tap points 63 and 64 on the secondary winding halves of the secondary winding of output transformer 19. The cathode electrodes of the respective diodes 71 and 72 are connected in common to the common connected cathodes of the silicon controlled rectifier devices 65 and 66. This common point is then of course connected through the filter inductance 67 across the filter capacitor 68 and load 69 to ground.

In operation the circuit arrangement of FIGURE 5 functions in the following manner. Assume that a 60 volt rectifier current power supply is connected across the terminals 17 and 18, and that the power transistor 16 is in a conducting condition. The various parts of the circuit then will have the voltages indicated appearing at the points indicated for this condition of operation. From a consideration of diode 71 and silicon controlled rectifier 66 it can be appreciated that the diode 71 will couple a positive 18 volt potential to the cathode of silicon controlled rectifier 66 to cause it to commutate off. On the alternate half cycle of operation of the new and improved power inverter circuit, a reverse condition will exist where the diode 72 will serve to couple a positive 18 volt potential to the cathode of silicon controlled rectifier 65 to cause it to commutate off. Accordingly, it can be appreciated that the overall circuit arrangement is self-commutating whenever the power transistors 15 and 16 are turned on or off in the new and improved power inverter circuit. By properly phasing the gating on signal supplied to the control gates of the two silicon controlled rectifiers 65 and 66 with the operation of the power transistors 15 and 16, a desired proportional of the direct current voltage can be supplied to the load 69. Accordingly, it can be appreciated therefore that the new and improved power inverter circuit is capable not only of supplying a desired alternating current output potential, but by very simple additions can provide a proportionally controlled direct current output potential in addition. This can be achieved by very simple circuit additions, without requiring additional commutating circuit elements since the overall circuit combinations can be made to be self commutating in the manner disclosed.

FIGURE 6 of the drawings illustrates an embodiment of the new and improved power inverter circuit wherein a plurality of isolated inhibit circuits are arranged around a common core to inhibit operation of the inverter circuit in the previously described manner in accordance with the various control phenomena to which they respond. To be particular, any overcurrent signal sensed by the overcurrent sensing resistor 42 is supplied across the conductors 41, 40 to individually control a control transistor $36_3$ and its associated inhibit windings $35_3$. Similarly the presence of second harmonics in the operating current output is detected by the second harmonic detecting saturable windings 42 or 43, and an alarm signal supplied over the conductors 48 and 49 to control the individual control transistor $36_2$. This control transistor $36_2$ then operates to turn on the inhibit winding means $35_2$ to inhibit operation of the inverter circuit in response to the presence of second harmonics in the output alternating current potential. Similarly, some other control phenomena sensed at another point in the equipment in which the new and improved power inverter is employed, may be supplied to the base of still another individual control transistor $36_1$ to turn that transistor. Transistor $36_1$ in turn circulates an inhibiting current through its associated inhibit winding $35_1$. It should be noted however that each of the inhibit winding means $35_1$, $35_2$, $35_3$ are all individually isolated one from the other, and therefore can't interact on each other to falsely inhibit operation of the new and improved power inverter. It should be further noted, that the overcurrent sensing resistor 42 is connected in the lead going to the negative terminal of the direct current power supply which terminal is normally grounded. This arrangement therefore allows the overcurrent sensing circuit to be normally grounded, a condition which ordinarily is to be desired.

FIGURE 7 of the drawings illustrates an embodiment of the new and improved power inverter circuit wherein PNP junction transistors 75 and 76 are used as the power transistors in the inverter circuit. Sinse PNP power transistors 75 and 76 are being employed it is necessary to reverse the polarity of the potentials of the power supply terminals 17 and 18 as well as to reverse the polarity of the connection of the diodes 25 and 26. In all other respects, the circuit of FIGURE 7 is identical to the circuit of FIGURE 1, and will operate in the same manner. It should be noted, however, that the bias potential $1e_{st2}$ applied to the base of the PNP junction transistor 75 is now negative in polarity to cause it to turn full on and of course the collector current flowing in the primary winding portion 11 of the circuit half including power transistor 75 will now be reversed with respect to the collector-emitter current flow in the circuit arrangement of FIGURE 1. Similar comment may be made with respect to the power transistor 76. The reversal in polarity of the potentials and the reversal in the direction of the current flow through the circuit arrangement does not in any way affect its operation; however, so that for all intents and purposes the operation of the circuit arrangement of FIGURE 7 can be stated to be similar to the circuit arrangement shown in FIGURE 1.

FIGURE 8 of the drawings discloses still another form of the new and improved power inverter circuit constructed in accordance with the invention which employs PNP junction transistors as the power transistors 75 and 76. The circuit arrangement of FIGURE 8 illustrates the manner in which the form of power inverter employing PNP junction transistor devices can be readily modified to incorporate no load current bias winding means 31 as well as inhibit winding means 35 to further control operation of the inverter circuit. Since these additional means operate in a manner similar to the versions of the circuit employing NPN junction power transistor devices (with the exception of the reversal in the polarities of the potentials and currents) further description of this form of circuit is believed unnecessary. In addition, it should be noted that the circuit arrangement of FIGURE 8 employs two separate saturable core structures wherein the winding portions 11, 13, $31_1$, and $35_1$ are wound around one core while the winding portions 12, 14, $31_2$, and $35_2$ are wound around a separate and different core. Whether a single core arrangement such as that shown in FIGURE 1 is employed, or multiple core arrangements such as shown in FIGURE 8 are employed, the circuit will operate in the manner previously described in connection with the circuit arrangement of FIGURE 1 to provide a desired alternating current output potential across the output terminals of the output transformer 19. It should be further noted that the diode 43 is shown to be alternative in FIGURE 8. Whether the diode 43 is used or not is determined by the threshold holding value of the base-emitter of the transistor 36. If this value is sufficiently high, diode 43 may be omitted. This choice of including diode 43 or not is also true of the circuits shown in FIGURES 3, 4 and 6.

From the foregoing description it can be appreciated that the invention makes available a new and improved power inverter circuit for converting direct current electric power to alternating current electric power. Because of its unique design, is capable of greater efficiency and less power loss than similar circuits previously available which are designed to accomplish the same end. Since the circuit it designed for use at rather high power levels, its improved efficiency becomes increasingly important due not only to its improved economy of operation, but also because of the reduction in the heating associated with operation of the circuit. Additionally, because of the characteristic ability of the circuit to absorb large surges of current, it makes filtering of the circuit output much simpler and with fewer components thereby facilitating its inclusion along with other components in an equipment of which it comprises a part. Further, because of its nature the circuit is both simple and inexpensive to manufacture as well as lightweight and compact in construction.

Having described several embodiments of a new and improved saturable current transformer-transistor inverter constructed in accordance with the invention, it is believed obvious that other modifications and variations of the present invention are possible in light of the above teachings. It is therefore to be understood that changes may be made in the particular embodiment of the invention described which are within the full intended scope of the invention as defined by the appended claims.

What I claim as new and desire to secure by Letters Patent of the United States is:

1. A new and improved inverter circuit including in combination saturable core current transformer means having at least two primary winding portions and respective inductively coupled secondary winding portions, a direct current power supply, an output transformer having a center tapped primary winding, and a pair of conductivity controlled conducting devices each having input terminals and output terminals, the output terminals of each of said conductivity controlled conducting devices being operatively connected in series circuit relationship with the direct current power supply and a respective primary winding portion of the saturable core transformer means across a respective winding half of the primary winding of the output transformer, and the input terminals of each conductivity controlled conducting device being connected to the respective secondary winding portion of the saturable core transformer means that is inductively coupled to the primary winding portion to which the output terminals of the controlled conducting device are connected, and no load current bias winding means operatively coupled across the primary winding portions of the saturable core transformer in parallel circuit relationship therewith and inductively coupled to the secondary winding portions of the saturable core current transformer means for supplying sufficient bias current to the input terminals of the conductivity controlled conducting devices during no load operating conditions of the inverter.

2. A new and improved inverter circuit including in combination saturable core current transformer means having at least two primary winding portions and respective inductively coupled secondary winding portions, a direct current power supply, an output transformer having a center tapped primary winding, and a pair of conductivity controlled conducting devices each having input terminals and output terminals, the output terminals of each of said conductivity controlled conducting devices being operatively connected in series circuit relationship with the direct current power supply and a respective primary winding portion of the saturable core transformer means across a respective winding half of the primary winding of the output transformer, and the input terminals of each conductivity controlled conducting device being connected to the respective secondary winding portion of the saturable core transformer means that is inductively coupled to the primary winding portion to which the output terminals of the controlled conducting device are connected, overcurrent sensing means operatively connected in series circuit relationship with the direct current power supply and each of said conductivity controlled conducting devices, inhibit winding means inductively coupled to the two secondary winding portions of the saturable core current transformer means for inhibiting the operation thereof, and control means connecting said overcurrent sensing means to said inhibit winding means for turning on said inhibit winding means to cause it to inhibit operation of the inverter in response to an overcurrent condition.

3. A new and improved inverter circuit including in combination saturable core current transformer means having at least two primary winding portions and respective inductively coupled secondary winding portions, a direct current power supply, an output transformer having a center tapped primary winding, and a pair of conductivity controlled conducting devices each having input terminals and output terminals, the output terminals of each of said conductivity controlled conducting devices being operatively connected in series circuit relationship with the direct current power supply and a respective primary winding portion of the saturable core transformer means across a respective winding half of the primary winding of the output transformer, and the input terminals of each conductivity controlled conducting device being connected to the respective secondary winding portion of the saturable core transformer means that is inductively coupled to the primary winding portion to which the output terminals of the controlled conducting device are connected, second harmonic detecting circuit means operatively coupled to said output transformer, inhibit winding means inductively coupled to the secondary winding portions of said saturable core current transformer means for inhibiting operation thereof, and control means interconnecting said second harmonic detecting circuit means and said inhibit winding means for turning on said inhibit winding means to cause it to inhibit operation of the inverter in response to the occurrence of second harmonics in the frequency of the output signal developed across the output transformer.

4. A new and improved inverter circuit including in combination saturable core current transformer means having at least two primary winding portions and respective inductively coupled secondary winding portions, a direct current power supply, an output transformer having a center tapped primary winding, and a pair of conductivity controlled conducting devices each having input terminals and output terminals, the output terminals of each of said conductivity controlled conducting devices being operatively connected in series circuit relationship with the direct current power supply and a respective primary winding portion of the saturable core transformer means across a respective winding half of the primary winding of the output transformer, and the input terminals of each conductivity controlled conducting device being connected to the respective secondary winding portion of the saturable core transformer means that is inductively coupled to the primary winding portion to which the output terminals of the controlled conducting device are connected, starting circuit means operatively coupled to the input terminals of each of said conductivity controlled conducting devices for initiating operation of the inverter circuit, impedance means operatively connected in common to the input terminals of both said conductivity controlled conducting devices for reducing the effect of mismatch in the characteristics of the two devices on the inverter circuit operation, no load current bias winding means operatively connected across the primary winding portions of the saturable core transformer in parallel circuit relationship therewith and inductively coupled to the secondary winding portions of said saturable core current transformer means for supplying the bias current to the input terminals of said conductivity controlled conducting device during no load current operating conditions of the inverter, overcurrent sensing means operatively connected in series circuit relationship with the direct current power supply and the output terminals of said conductivity controlled conducting devices for sensing an overcurrent condition, second harmonic detecting circuit means operatively coupled to the output transformer for detecting the occurrence of second harmonics in the frequency of the output signal developed across the output transformer, inhibit winding means inductively coupled to the secondary winding portions of said saturable core current transformer means for inhibiting the operation thereof, and control means operatively interconnecting said overcurrent sensing means and said second harmonic detecting circuit means to said inhibit winding means for turning on said inhibit winding means to cause it to inhibit operation of the inverter, and additional control circuit means operatively connected to said inhibit winding means for turning on said inhibit winding means in respose to a additional control phenomena and thereby cause it to inhibit operation of the inverter in response to the additional control phenomena.

5. A new and improved inverter circuit including in combination saturable core current transformer means having at least two primary winding portions and two secondary winding portions inductively coupled to associated ones of the respective primary winding portions, a direct current power supply, an output transformer having a center tapped primary winding, and a pair of conductivity controlled NPN junction transistor devices each having a base-emitter circuit and an emitter-collector circuit, the emitter-collector circuit of each of said NPN junction transistor devices being operatively connected in series circuit relationship with the direct current power supply and a respective primary winding portion of the saturable core current transformer means across a respective winding half of the primary winding of the output transformer, and the base-emitter circuit of each of the NPN junction transistor devices being connected to the respective secondary winding portion of the saturable core current transformer means that is inductively coupled to the primary winding portion to which the respective emitter-collector circuit of the NPN junction transistor device is connected, and no load current bias winding means operatively connected across the primary winding portions of the saturable core transformer in parallel circuit relationship therewith and inductively coupled to the secondary winding portions of the saturable core current transformer means for providing a bias current to the emitter-base circuits of the NPN junction transistor devices during no load current operating conditions of the inverter.

6. A new and improved inverter circuit including in combination saturable core current transformer means having at least two primary winding portions and two secondary winding portions inductively coupled to associated ones of the respective primary winding portions, a direct current power supply, an output transformer having a center tapped primary winding, and a pair of conductivity controlled NPN junction transistor devices each having a base-emitter circuit and an emitter-collector circuit, the emitter-collector circuit of each of said NPN junction transistor devices being operatively connected in series circuit relationship with the direct current power supply and a respective primary winding portion of the saturable core current transformer means across a respective winding half of the primary winding of the output transformer, and the base-emitter circuit of each of the NPN junction transistor devices being connected to the respective secondary winding portion of the saturable core current transformer means that is inductively coupled to the primary winding portion to which the respective emitter-collector circuit of the NPN junction transistor device is connected, overcurrent sensing means operatively connected in series circuit relationship with the direct current power supply and the emitter-collector circuits of said NPN junction transistor devices, inhibit winding means inductively coupled to the secondary winding portions of said saturable core current transformer means for inhibiting operation thereof, and control means interconnecting the overcurrent sensing means and the inhibit winding means for turning on the inhibit winding means in response to an overcurrent condition to thereby inhibit further operation of the inverter.

7. A new and improved inverter circuit including in combination saturable core current transformer means having at least two primary winding portions and two secondary winding portions inductively coupled to associated ones of the respective primary winding portions, a direct current power supply, an output transformer having a center tapped primary winding, and a pair of conductivity controlled NPN junction transistor devices each having a base-emitter circuit and an emitter-collector circuit, the emitter-collector circuit of each of said NPN junction transistor devices being operatively connected in series circuit relationship with the direct current power supply and a respective primary winding portion of the saturable core current transformer means across a respective winding half of the primary winding of the output transformer, and the base-emitter circuit of each of the NPN junction transistor devices being connected to the respective secondary winding portion of the saturable core current transformer means that is inductively coupled to the primary winding portion to which the respective emitter-collector circuit of the NPN junction transistor device is connected, second harmonic detecting circuit means operatively connected to the output transformer for detecting the occurrence of a second harmonic in the frequency of the output signal developed by the output transformer, inhibit winding means inductively coupled to the secondary winding portions of the saturable core current transformer means for inhibiting operation thereof, and control means interconnecting the second harmonic detecting circuit means and the inhibit winding means for turning on the inhibit winding means in response to the occurrence of second harmonics in the frequency of the alternating output current developed across the output transformer to thereby inhibit further operation of the inverter.

8. A new and improved inverter circuit including in combination saturable core current transformer means having at least two primary winding portions and two secondary winding portions inductively coupled to associated ones of the respective primary winding portions, a direct current power supply, an output transformer having a center tapped primary winding, and a pair of conductivity controlled NPN junction transistor devices each having a base-emitter circuit and an emitter-collector circuit, the emitter-collector circuit of each of said NPN junction transistor devices being operatively connected in series circuit relationship with the direct current power supply and a respective primary winding portion of the saturable core current transformer means across a respective winding half of the primary winding of the output transformer, and the base-emitter circuit of each of the NPN junction transistor devices being connected to the respective secondary winding portion of the saturable core current transformer means that is inductively coupled to the primary winding portion to which the respective emitter-collector circuit of the NPN junction transistor device is connected, starting circuit means operatively coupled to the base-emitter circuit of each of the NPN junction transistor devices for initiating operation of the inverter circuit, additional impedance means operatively connected in common to the base-emitter circuits of both said NPN junction transistor devices for reducing the effect of mismatch in the characteristics of the two devices on the inverter circuit operation, no load current bias winding means operatively connected across the primary winding portions of the saturable core transformer in parallel relationship therewith and inductively coupled to the secondary winding portions of the saturable core current transformer means for supplying a bias current to the emitter-base circuits of both said NPN junction transistor devices during no load current operating conditions of the inverter, overcurrent sensing means operatively connected in series circuit relationship with the direct current power supply and the emitter-collector circuits of both said NPN junction transistor devices, second harmonic detecting circuit means operatively connected across the output transformer for detecting the presence of second harmonics in the frequency of the output alternating current developed by the output transformer, additional control means responsive to additional control phenomena for use in controlling operation of the inverter, inhibit winding means inductively coupled to the secondary winding portions of the saturable core current transformer for inhibiting operation thereof, and means for operatively coupling each of said overcurrent sensing means, said second harmonic detecting circuit means, and said additional control means to said inhibit winding means for turning on said inhibit winding means to cause it to inhibit further operation of the inverter in response to an overcurrent condition, a second harmonic condition or the additional control phenomenon.

9. A new and improved inverter circuit including in combination saturable core current transformer means having at least two primary winding portions and respective inductively coupled secondary winding portions, a direct current power supply, an output transformer having a center tapped primary winding, and a pair of conductivity controlled conducting devices each having input terminals and output terminals, the output terminals of each of said conductivity controlled conducting devices being operatively connected in series circuit relationship with the direct current power supply and a respective primary winding portion of the saturable core transformer means across a respective winding half of the primary winding of the output transformer, and the input terminals of each conductivity controlled conducting device being connected to the respective secondary winding portion of the saturable core transformer means that is inductively coupled to the primary winding portion to which the output terminals of the controlled conducting device are connected, said output transformer also having a center tapped secondary winding with the primary winding having intermediate tap points connected to each of the primary winding halves thereof, and the center tapped secondary winding also having intermediate tap points connected to the secondary winding halves thereof, a pair of silicon controlled rectifier devices having one set of corresponding load terminals connected to respective ones of the intermediate tap points on the primary winding of the output transformer and having their remaining set of corresponding load terminals connected in common to a suitable load, and a pair of diodes having the load terminals thereof corresponding to the first mentioned one set of load terminals of the silicon controlled rectifier devices connected to respective ones of the intermediate tap points on the secondary winding of the output transformer, and having the load terminals thereof corresponding to the second mentioned remaining load terminals of the silicon controlled rectifier devices connected in common to the load in common with the said second mentioned remaining load terminals of the silicon controlled rectifier devices.

10. A new and improved inverter circuit including in combination saturable core current transformer means having at least two primary winding portions and two secondary winding portions inductively coupled to associated ones of the respective primary winding portions, a direct current power supply, an output transformer having a center tapped primary winding, and a pair of conductivity controlled NPN junction transistor devices each having a base-emitter circuit and an emitter-collector circuit, the emitter-collector circuit of each of said NPN junction transistor devices being operatively connected in series circuit relationship with the direct current power supply and a respective primary winding portion of the saturable core current transformer means across a respective winding half of the primary winding of the output transformer, and the base-emitter circuit of each of the NPN junction transistor devices being connected to the respective secondary winding portion of the saturable core current transformer means that is inductively coupled to the primary winding portion to which the respective emitter-collector circuit of the NPN junction transistor device is connected, further characterized by a starting resistor operatively connected in series circuit relationship with the direct current power supply and the emitter-collector circuits of each of said NPN junction transistor devices for initiating operation of the inverter circuit, at least one blocking diode connected in common to the emitter-base circuits of both said NPN junction transistor devices with a polarity to block direct current flow through the direct current power supply and through the starting resistor whereby starting current flowing through the starting resistor must flow through the emitter-base circuit of at least one of the NPN junction transistors, a no load current bias winding operatively coupled through limiting resistors across the primary winding portions of the saturable core transformer in parallel circuit relationship therewith and inductively coupled to the secondary winding portions of the saturable core current transformer means, inhibit winding means inductively coupled to the secondary winding portions of the saturable core current transformer means for inhibiting operation thereof, overcurrent sensing means operatively connected in series circuit relationship with the direct current power supply and the emitter-collector circuits of each of the NPN junction transistor devices, control means operatively coupling the overcurrent sensing means to the inhibit winding means for controlling turn on of the inhibit winding means to thereby inhibit further operation of the inverter in response to an overcurrent condition, and filter means operatively connected in the direct current power supply connected to the inverter circuit and including at least a smooth capacitor connected across the direct current power supply terminals to the inverter.

References Cited by the Examiner

UNITED STATES PATENTS

| | | | |
|---|---|---|---|
| 2,968,738 | 1/1961 | Pintell. | |
| 3,004,226 | 10/1961 | Jensen | 331—113 |
| 3,102,206 | 8/1963 | Morgan | 307—88.5 X |
| 3,139,595 | 6/1964 | Barber | 331—113 X |
| 3,151,287 | 9/1964 | Pintell. | |
| 3,176,243 | 3/1965 | Meier | 331—113 |
| 3,243,725 | 3/1966 | Raposa et al. | 331—113 |

FOREIGN PATENTS

| | | |
|---|---|---|
| 1,254,327 | 1/1961 | France. |
| 1,112,135 | 8/1961 | Germany. |

ROY LAKE, *Primary Examiner.*

J. B. MULLINS, *Assistant Examiner.*